US009162731B2

(12) United States Patent
Maltais

(10) Patent No.: US 9,162,731 B2
(45) Date of Patent: Oct. 20, 2015

(54) SNOWMOBILE

(75) Inventor: Hugues Maltais, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 379 days.

(21) Appl. No.: 13/131,875

(22) PCT Filed: Nov. 28, 2008

(86) PCT No.: PCT/US2008/085060
§ 371 (c)(1),
(2), (4) Date: May 30, 2011

(87) PCT Pub. No.: WO2010/062294
PCT Pub. Date: Jun. 3, 2010

(65) Prior Publication Data
US 2011/0290574 A1    Dec. 1, 2011

(51) Int. Cl.
*B62M 27/02*    (2006.01)
(52) U.S. Cl.
CPC ......... *B62M 27/02* (2013.01); *B62M 2027/026* (2013.01); *B62M 2027/027* (2013.01); *B62M 2027/028* (2013.01)
(58) Field of Classification Search
CPC ........... B62M 27/02; B62M 2027/026; B62M 2027/027; B62M 2027/028
USPC ......................................... 180/182, 186, 190
See application file for complete search history.

(56) References Cited

U.S. PATENT DOCUMENTS

| 3,504,752 | A | * | 4/1970 | Milward | 180/190 |
|---|---|---|---|---|---|
| 3,608,658 | A | * | 9/1971 | Woodfill et al. | 280/21.1 |
| 3,674,103 | A | * | 7/1972 | Kiekhaefer | 180/190 |
| 3,734,221 | A | * | 5/1973 | Labelle | 180/190 |
| 3,739,867 | A | * | 6/1973 | Drawe | 180/193 |
| 3,765,498 | A | * | 10/1973 | Rogerson | 180/190 |
| 3,767,275 | A | | 10/1973 | Russ | |
| 3,789,938 | A | * | 2/1974 | Hetteen | 180/190 |
| 4,036,320 | A | * | 7/1977 | Rabehl | 180/9.1 |
| 4,133,400 | A | * | 1/1979 | Shiraishi | 180/193 |
| 4,442,913 | A | | 4/1984 | Grinde | |
| 4,489,954 | A | * | 12/1984 | Yasui et al. | 280/21.1 |
| 4,688,817 | A | * | 8/1987 | Marier | 280/278 |
| 4,826,185 | A | | 5/1989 | Blanchard et al. | |
| 5,033,572 | A | | 7/1991 | Zulawski | |

(Continued)

OTHER PUBLICATIONS

International Search Report of PCT/US2008/085060; Jun. 26, 2009; Nico BOOIJ.

*Primary Examiner* — Anna Marie Boehler
*Assistant Examiner* — Maurice Williams
(74) *Attorney, Agent, or Firm* — BCF LLP

(57) ABSTRACT

A snowmobile (100) has a frame (106) comprising a tunnel (108) and an engine cradle (110) containing an engine (114). A drive track (126) is operatively connected to the tunnel. A front drive axle (127) connected to the engine engages the drive track. A front (102) of the snowmobile comprises a hull connected to the frame and to front telescopic suspension struts (112). The snowmobile also comprises front skis (116) connected at attachment points (150) to the front telescopic suspension struts. The drive track has a front portion (125) defining a track angle (B) between 20 and 40 degrees from horizontal. A horizontal distance (C) between the attachment points and the front drive axle is between 600 mm and 900 mm. The hull has a bottom surface (160) wherein at least a portion has an average hull angle (A) between 10 and 30 degrees from horizontal.

6 Claims, 7 Drawing Sheets

(56) References Cited

U.S. PATENT DOCUMENTS

| | | | |
|---|---|---|---|
| 5,860,486 A * | 1/1999 | Boivin et al. | 180/193 |
| 6,926,108 B1 | 8/2005 | Polakowski et al. | |
| 6,942,050 B1 | 9/2005 | Honkala et al. | |
| 7,040,426 B1 | 5/2006 | Berg | |
| 7,124,846 B2 * | 10/2006 | Bedard et al. | 180/182 |
| 7,377,347 B2 | 5/2008 | Rasidescu et al. | |
| 7,455,141 B2 | 11/2008 | Hildebrand | |
| 7,753,154 B2 | 7/2010 | Maltais | |
| 8,596,399 B1 * | 12/2013 | Gauld | 180/181 |
| 2002/0000340 A1 * | 1/2002 | Laimbock | 180/219 |
| 2007/0114085 A1 * | 5/2007 | Girouard et al. | 180/190 |
| 2009/0050389 A1 * | 2/2009 | Watling | 180/190 |

* cited by examiner

SNOWMOBILE

FIELD OF THE INVENTION

The present invention relates to snowmobiles designed for off-trail riding.

BACKGROUND OF THE INVENTION

Off-trail snowmobiles must be able to advance through deep snow, whether it be soft powder or heavy damp snow. In either case, an off-trail snowmobile must be able to propel itself onto the snow rather than through the snow. Off-trail snowmobiling is done most of the time at relatively low speeds compared to the maximum speed the snowmobile is capable of, or compared to cruising speeds on groomed trails. Because of this low speed, the snowmobile cannot rely on its own momentum to get through the deep snow but rather on its floatation characteristics to push the snowmobile on top of the snow and reduce the drag between the snow and the snowmobile body components.

Several structural parts of a snowmobile are playing a role in maintaining the snowmobile on top of the snow. A drive track and skis provide the majority of the floatation. In an off-trail snowmobile, the drive track is usually wider and longer than on an on-trail snowmobile so as to provide better floatation. The snowmobile has a frame to which skis are attached through a pair of front suspensions. The front suspensions are connected to the skis at attachment points. The type of suspension can become critical while riding off trails as they can influence the weight balance of the vehicle. Other body parts of a snowmobile are designed for aesthetic purposes, reducing noise to the environment and for reducing drag with ambient air.

However, even by applying the above-mentioned principles, some snowmobiles, while having great trail riding performance, fail in riding through deep snow. When riding in deep snow these snowmobiles push the snow instead of floating on the snow.

Therefore, there is a need for a snowmobile designed for deep snow riding. Such an off-trail snowmobile design would avoid accumulation of the snow at the hull and at the drive track without compromising maneuverability.

SUMMARY OF THE INVENTION

It is an object of the present invention to ameliorate at least some of the inconveniences present in the prior art.

Four design parameters other than those usually associated with off-trail snowmobiles have been found to affect floatation in off-trail riding: average hull angle, track angle, distance of the attachment points of the skis to a front drive axle engaging the drive track and the choice of front suspensions.

For purposes of this application, the term 'hull angle' means an angle formed between a line tangential to the bottom surface of the hull and horizontal. The term 'average hull angle' means the average of each hull angle along the bottom surface of the hull. As would be understood, for snowmobiles having an at least partially rounded bottom surface of the hull, it is possible to estimate the average hull angle by drawing multiple line segments between various points along the bottom surface of the hull and taking the average angle of these segments. As would be understood, the more segments are used the more accurate the estimate will be. However, for simplicity, the average hull angle can also be estimated by measuring the angle of a line extending from a point P1 (FIG. 4) located at the lowest point of the bottom surface of the hull disposed in a plane containing the steering axes S of both skis (FIG. 4, S is centrally positioned in each of the telescopic suspension struts) and a point P2 (FIG. 4) corresponding to a point along the bottom surface of the hull having a hull angle of 35 degrees. The term 'track angle' means the angle formed between a substantially linear front portion of the drive track and the horizontal. The term 'ground clearance' means a distance from a lowest point of the hull or frame from the ground. For purposes of this application, measurements are taken when the snowmobile is resting horizontally on flat, even ground and with no load applied thereon. When resting, the belt portion of the bottom portion of the drive track is in contact with the ground, and lugs are recessed in the ground (as they would be when the ground is covered with snow). Also for purposes of this application, terms related to spatial orientation such as forwardly, rearwardly, left, and right, are as they would normally be understood by a driver of the snowmobile sitting thereon in a normal driving position.

When the average hull angle is too high, the bottom surface of the hull creates a wall with the oncoming snow and tends to push the snow as a plow would do. However, when the average hull angle is too low, the engine and the front drive axle have to be raised to ensure enough ground clearance. The ground clearance must be high enough for the snowmobile to run on uneven grounds and so as not to create a wall with the oncoming snow. In addition to cause the snowmobile to be unstable, a high ground clearance induces a large track angle, which is problematic as discussed below. Therefore, a range of average hull angles was identified which addresses the above.

When the track angle is too high, the front portion tends to create a wall and to push the snow forward. Eventually, the wall of snow prevents the snowmobile from continuing to move forward, and as a result the drive track spins relative to the snow and begins to dig a hole. However, when the snowmobile is designed with a track angle that is too small, the tunnel has to be lowered. A snowmobile with a low tunnel has too little ground clearance resulting in the tunnel dragging over the snow and generating friction. Therefore, a range of track angles was identified which addresses the above.

A large distance between the attachment points of the front suspensions to the skis and the front drive axle has the effect of increasing the moment the ski creates to turn the snowmobile. Because the drive track in an off-trail snowmobile is often longer and wider, the friction created by the drive track induces less maneuverability. As a result, a longer distance applies more turning torque and helps overcome the friction between the drive track and the snow on the ground. In addition, such a longer snowmobile would be inconvenient to package and to maneuver. Therefore, a range of distances between the attachment points of the skis to the front suspensions and the front drive axle was identified which addresses the above.

Finally, the choice of front suspensions also has an effect on the deep snow capabilities of the snowmobile. A double A-arm type of suspension has more components that can drag in the snow and thus hinders its forward movement. However, telescopic suspension struts do not drag in the snow since there are always in the path created by the skis.

Although any one of the above may provide improved off-trail performance, it was found that the right combinations of an average hull angle, a track angle, and a distance from the attachment points to the front drive axle within the identified ranges, together with the choice of telescopic suspension struts were found to provide optimum performance for an off-trail snowmobile.

In one aspect the present invention provides a snowmobile having a front and a rear comprising a frame comprising a tunnel and an engine cradle connected to a front of the tunnel. An engine is mounted in the engine cradle. A drive track is operatively connected to the tunnel. The drive track is operatively connected to the engine to propel the snowmobile. The drive track comprises a bottom portion and a front portion. The bottom portion is horizontal. The front portion has a lower end and an upper end. The front portion extends forwardly and upwardly from the lower end to the upper end. The front portion defines a track angle between 20 and 40 degrees from horizontal. A front drive axle is operatively connected to the engine and operatively engaging the drive track. A straddle seat is disposed on the tunnel rearwardly of the engine. Left and right telescopic suspension struts are operatively connected to the engine cradle. Left and right skis are connected to the left and right telescopic suspension struts at left and right attachment points respectively. A horizontal distance between the left and right attachment points and the front drive axle is between 600 mm and 900 mm. A steering column is operatively connected to the left and right skis to steer the skis. A handlebar is connected to the steering column. A hull is connected to the frame at least partially forward of the engine cradle. The hull has a bottom surface. At least a portion of the bottom surface of the hull extends forwardly and upwardly toward the front of the snowmobile. The portion of the bottom surface has an average hull angle between 10 and 30 degrees from horizontal.

In an additional aspect, the left and right telescopic suspension struts have up to 150 mm of travel.

In a further aspect, the track angle is between 30 and 40 degrees from horizontal.

In an additional aspect, the track angle is about 37 degrees from horizontal.

In a further aspect, the horizontal distance between the left and right attachment points and the front drive axle is between 700 mm and 800 mm.

In an additional aspect, the horizontal distance between the left and right attachment points and the front drive axle is about 785 mm.

In a further aspect, the average hull angle is between 15 and 25 degrees from horizontal.

In an additional aspect, the average hull angle is about 18 degrees from horizontal.

In a further aspect, the left and right telescopic suspension struts are at an angle of about 67 degrees from horizontal.

In an additional aspect, a ground clearance of the snowmobile is about 180 mm.

In a further aspect, the front drive axle is about 305 mm vertically above the bottom portion of the drive track.

In an additional aspect, the surface of the portion of the bottom surface of the hull is at least 50% of the surface of the bottom surface of the hull.

In a further aspect, a hull angle of the portion of the bottom surface of the hull measured from horizontal continuously increases from a rear of the bottom surface of the hull to a front of the bottom surface of the hull.

In another aspect the invention provides a snowmobile having a front and a rear comprising a frame comprising a tunnel and an engine cradle connected to a front of the tunnel. An engine is mounted in the engine cradle. A drive track is operatively connected to the tunnel. The drive track is operatively connected to the engine to propel the snowmobile. The drive track comprises a bottom portion and a front portion. The bottom portion is horizontal. The front portion has a lower end and an upper end. The front portion extends forwardly and upwardly from the lower end to the upper end. The front portion defining a plane at a track angle. A front drive axle is operatively connected to the engine and operatively engaging the drive track. A straddle seat disposed on the tunnel rearwardly of the engine. Left and right telescopic suspension struts are operatively connected to the engine cradle. Left and right skis are connected to the left and right telescopic suspension struts at left and right attachment points respectively. A steering column is operatively connected to the left and right skis to steer the skis. A handlebar connected to the steering column. A hull connects to the frame forward to the engine cradle. The hull has a bottom surface. At least a portion of the bottom surface of the hull extends forwardly and upwardly toward the front of the snowmobile. A line tangential to the portion of bottom surface of the hull at an average hull angle intersects the plane at an intersection point below and forward of the bottom portion of the drive track.

In an additional aspect, the surface of the portion of the bottom surface of the hull is at least 50% of the surface of the bottom surface of the hull.

In a further aspect, the intersection point is rearward of the drive axle.

In an additional aspect, the track angle is between 30 and 40 degrees from horizontal.

In a further aspect, a horizontal distance between the left and right attachment points and the front drive axle is between 700 mm and 800 mm.

In an additional aspect, the average hull angle is between 15 and 25 degrees from horizontal.

In an additional aspect, a hull angle of the portion of the bottom surface of the hull measured from horizontal continuously increases from a rear of the bottom surface of the hull to a front of the bottom surface of the hull.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
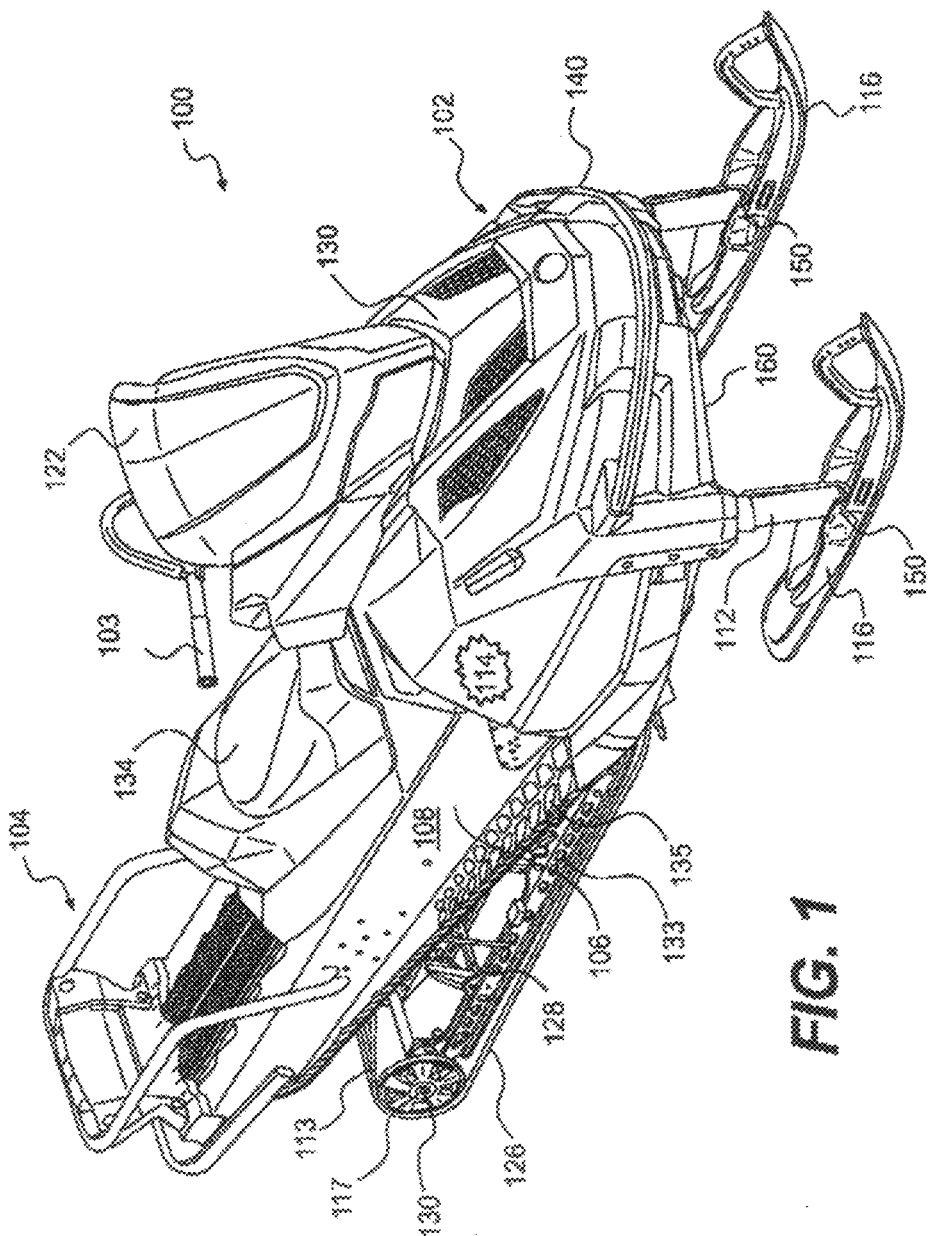
FIG. 1 is a perspective view, taken from a front, right side of a snowmobile.
Figure 2:
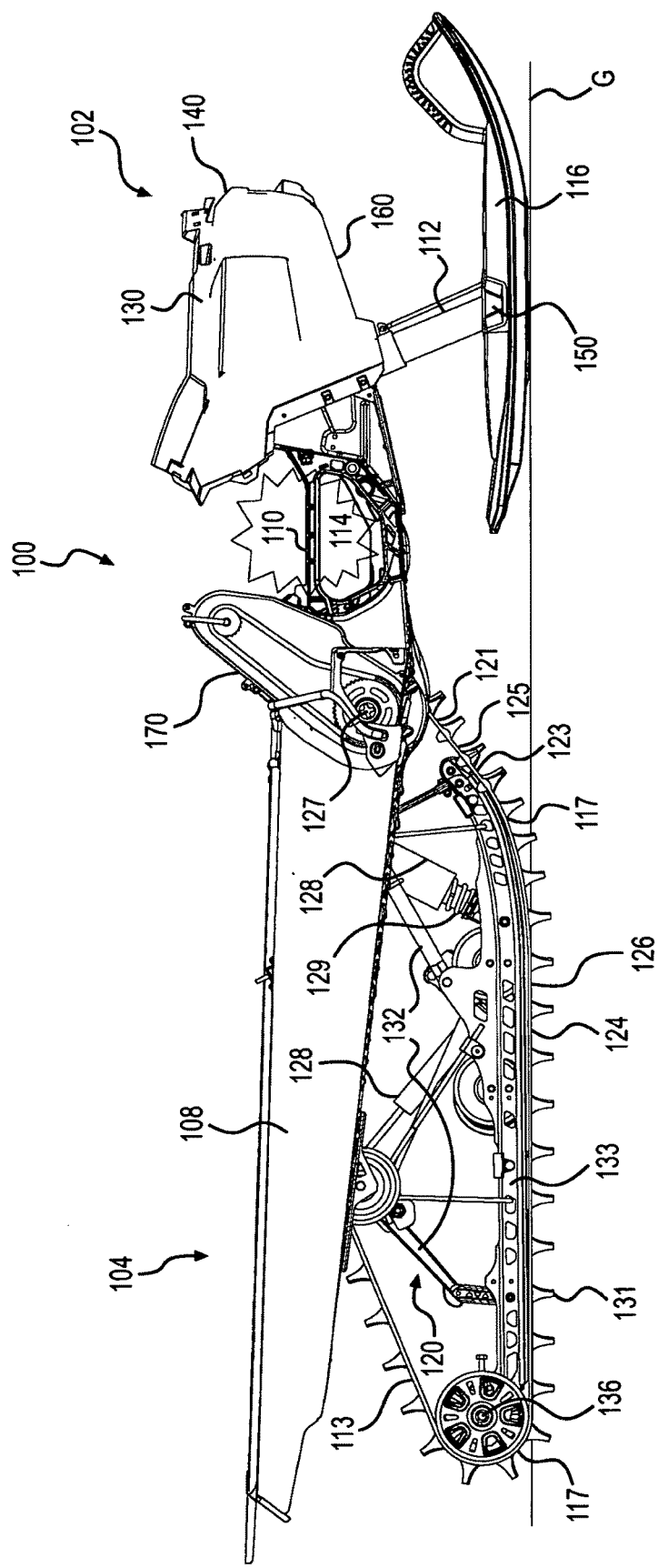
FIG. 2 is a right side elevation view of the snowmobile of FIG. 1.

As shown in FIG. 1, a snowmobile 100 according to the present invention includes a front portion 102 and a rear portion 104 which are defined consistently with a forward travel direction of the vehicle. As best seen in FIG. 2, the snowmobile 100 includes a frame (also known as a chassis) 106 which includes a rear tunnel 108, an engine cradle 110 (seen in FIG. 2) attached to a forward portion of the tunnel 108 and extending forwardly therefrom, and a left and right telescopic suspension struts 112 disposed forwardly of the engine cradle 110 and attached thereto in a manner that will be discussed below in further detail. The tunnel 108 generally consists of one or more pieces of a suitable sheet metal such as aluminium or steel stamped into an inverted U-shape. An engine 114 (shown schematically) is disposed on the engine cradle 110, which forms part of an engine compartment. The engine 114 is oriented such that the crankshaft (not shown) is transverse to the normal direction of travel of the snowmobile 100. Left and right skis 116 are positioned at the front portion 102 of the snowmobile 100 and are attached to the frame 106 via left and right telescopic suspension struts 112. The left and right telescopic suspension struts 112 are attached to the left and right skis 116 at left and right attachment points 150. Each ski 116 is operatively connected to a steering assembly which includes a steering column (not shown) connected to a handlebar 103. The handlebar 103 is used to rotate the skis 116 in order to steer the vehicle.

As best shown in FIG. 2, a drive track 126 is disposed under the tunnel 108 of the frame 106. The drive track 126, which is an endless belt, comprises an upper portion (not shown) accommodated within the tunnel 108, a bottom portion 124 to be in contact with the ground G when the snowmobile is in operation, a rear portion 113 and a front portion 125. Each portion of the drive track 126 is substantially straight and the portions are connected together by rounded connecting sections 117 of the drive track 126. The front portion 125 comprises an upper end 121 and a lower end 123. The upper end 121 connects to a front drive axle assembly 127 via one of the rounded connecting section 117 and sprocket wheels (not shown). The lower end 123 connects to the bottom portion 124 of the drive track 126 via another or the rounded connecting section 117. The front drive axle assembly 127 is about 305 mm vertically above the bottom portion of the drive track. The drive track 126 is a belt typically made of rubber and comprises external lugs 131 to grip to the ground G and internal lugs (not shown) to grip to the sprocket wheels. The drive track 126 is operatively connected to the engine 114 through a transmission system 170. The transmission system 170 comprises the front drive axle assembly 127 and is mounted to the tunnel 108.

The rear suspension assembly 120 includes rear suspension struts 132, a pair of slide rails 133 which generally position and guide the drive track 126 and idler wheels 136. The slide rails 133 typically include a sliding lower surface made of polyethylene to reduce contact friction between the slide rails 133 and the drive track 126. The rear suspension assembly 120 also includes two shock absorbers 128 and a coil spring 129 surrounding one of the shock absorbers 128. It is contemplated that the rear suspension assembly 120 could also include several shock absorbers 128 and may or may not comprise coil springs 129.

At the front portion 102 of the snowmobile 100, a cowling 130 made of multiple parts encloses the engine 114 and the transmission system 170. The hull 140 provides an external shell that not only protects the engine 114 and the transmission system 170, but can also be decorated to make the snowmobile 100 more aesthetically pleasing. At least one part of the hull 140 can be opened or removed to allow access to the engine 114 and the transmission system 170, for example for inspection or maintenance thereof. As shown in FIG. 1, a windshield 122 is connected to the hull 140 near the front portion 102 of the snowmobile 100. Alternatively, the windshield 122 could be connected directly to the handlebar 103. The windshield 122 acts as a wind screen to lessen the force of the air on the rider while the snowmobile 100 is moving.

A straddle seat 134 for a driver, and optionally one or more passengers, is positioned atop the tunnel 108 and extends from the rear portion 104 of the snowmobile 100 to the cowling 130. Two footrests 135 are positioned on opposite sides of the snowmobile 100 below the straddle seat 134 to accommodate the driver's and passenger's feet.

Figure 3:
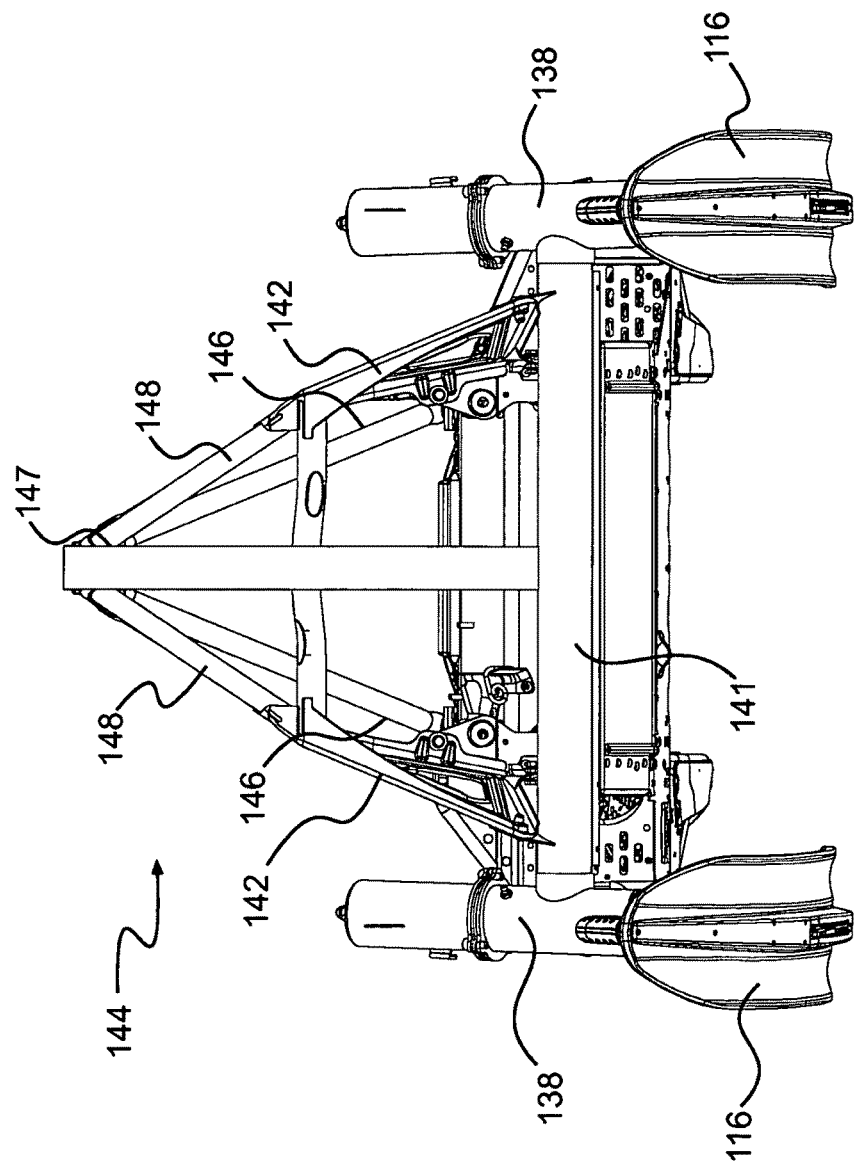
FIG. 3 is a front elevation view of a frame and skis of the snowmobile of FIG. 1.

With reference to FIG. 3, the left and right telescopic suspension struts 112 consists of left and right telescopic shock absorber assemblies 138 connected to opposite ends of a transverse cross member 141. The telescopic suspension struts 112 are spaced apart from the engine cradle 110 and are connected by a cross-member 141 which is supported thereon by two support members 142. The telescopic suspension struts 112 have up to 150 mm of travel. It is contemplated that a single support member, or more than two support members, may alternatively be used. A pyramidal support structure 144 is disposed generally above the frame 106 and serves to add rigidity to the frame 106. The support structure 144 includes two rearward members 146 attached to the tunnel 108 at their base and extending upwardly, forwardly and laterally inwardly therefrom to the apex of the support structure 144. Two forward members 148 of the support structure 144 extend downwardly, forwardly and laterally outwardly from the apex of the support structure 144 and are connected to the support members 142.

The structure of the support members 142, as well as the number of support members 142 and their arrangement on the frame 106, are selected such that the support members 142 provide a crumple zone between the telescopic suspension struts 112 and the engine cradle 110. The crumple zone is designed such that if a force exerted on the telescopic suspension strut 112 would ordinarily be great enough to cause plastic deformation of the tunnel 108, the engine cradle 110 or the support structure 144, the support members 142 will preferentially undergo plastic deformation, thereby absorbing the impact and preventing the force of the impact from being transmitted to the tunnel 108, the engine cradle 110 or the support structure 144. The crumple zone is also designed such that if a force exerted on the telescopic suspension strut 112 would be too small to cause plastic deformation of the tunnel 108, the engine cradle 110 or the support structure 144, the support members 142 will maintain their shape. The support members 142 can preferably withstand a force as close as possible to the minimum force that would damage the tunnel 108, the engine cradle 110 or the support structure 144, to provide as rigid a frame 106 as possible while still undergoing plastic deformation in preference to the tunnel 108, the engine cradle 110 or the support structure 144 when experiencing a severe impact.

Additional aspects and features of a snowmobile will be recognized by persons skilled in the art, and will not be described in detail herein.

Figure 4:
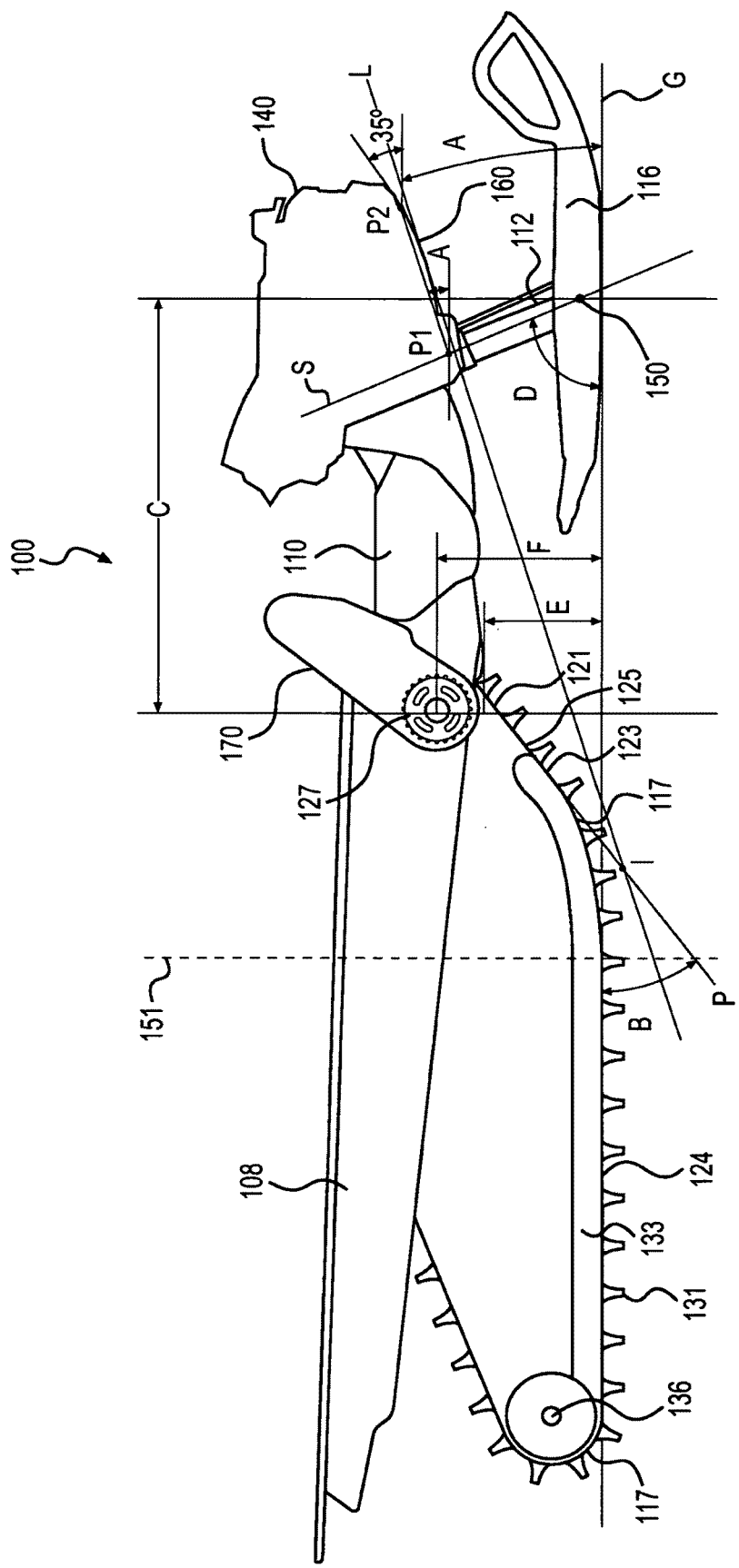
FIG. 4 is a schematic right side elevation view of the snowmobile of FIG. 1.
Figure 5:
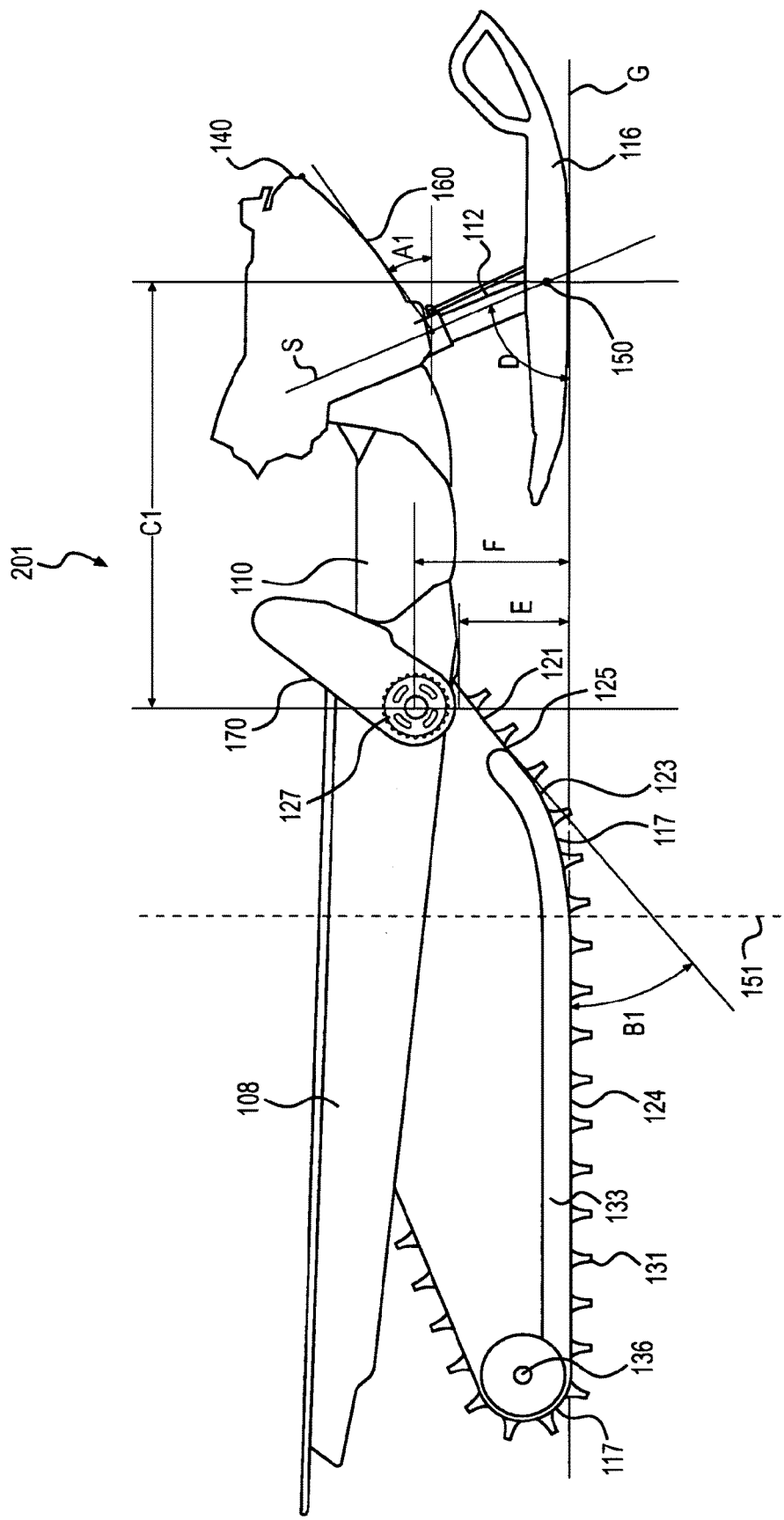
FIG. 5 is a schematic right side elevation view of another embodiment of the snowmobile of FIG. 1.
Figure 6:
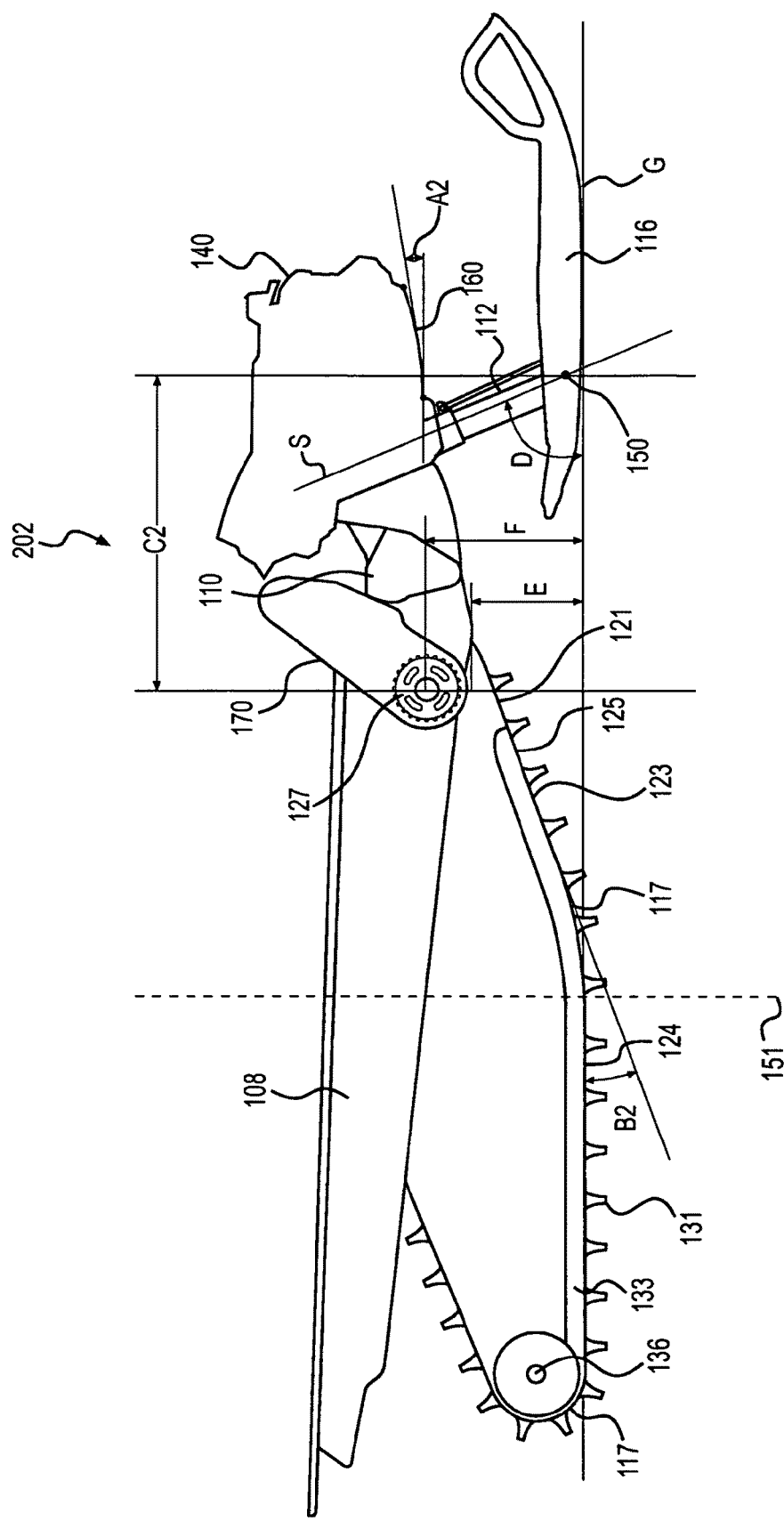
FIG. 6 is a schematic right side elevation view of yet another embodiment of the snowmobile of FIG. 1.

With respect to FIGS. 4, 5 and 6, in the snowmobiles 100, 201 and 202, the left and right telescopic suspension struts 112 form an angle D with horizontal, preferably of 67 degrees. The ground clearance E is preferably at least 180 mm. The front drive axle assembly 127 is at a distance F of about 305 mm from the ground G. Other values of D, E, and F are contemplated.

With reference to FIG. 4, parameters of the snowmobile 100 providing floatation while off trail will be described.

A first parameter is an average hull angle A. Line L is a line tangential to the bottom surface 160 of the hull 140 and disposed at the average hull angle A. In this embodiment, the average hull angle A is about 18 degrees. It is contemplated that the average hull angle A could alternatively be between 10 and 30 degrees, and preferably between 15 and 25 degrees.

Figure 7:
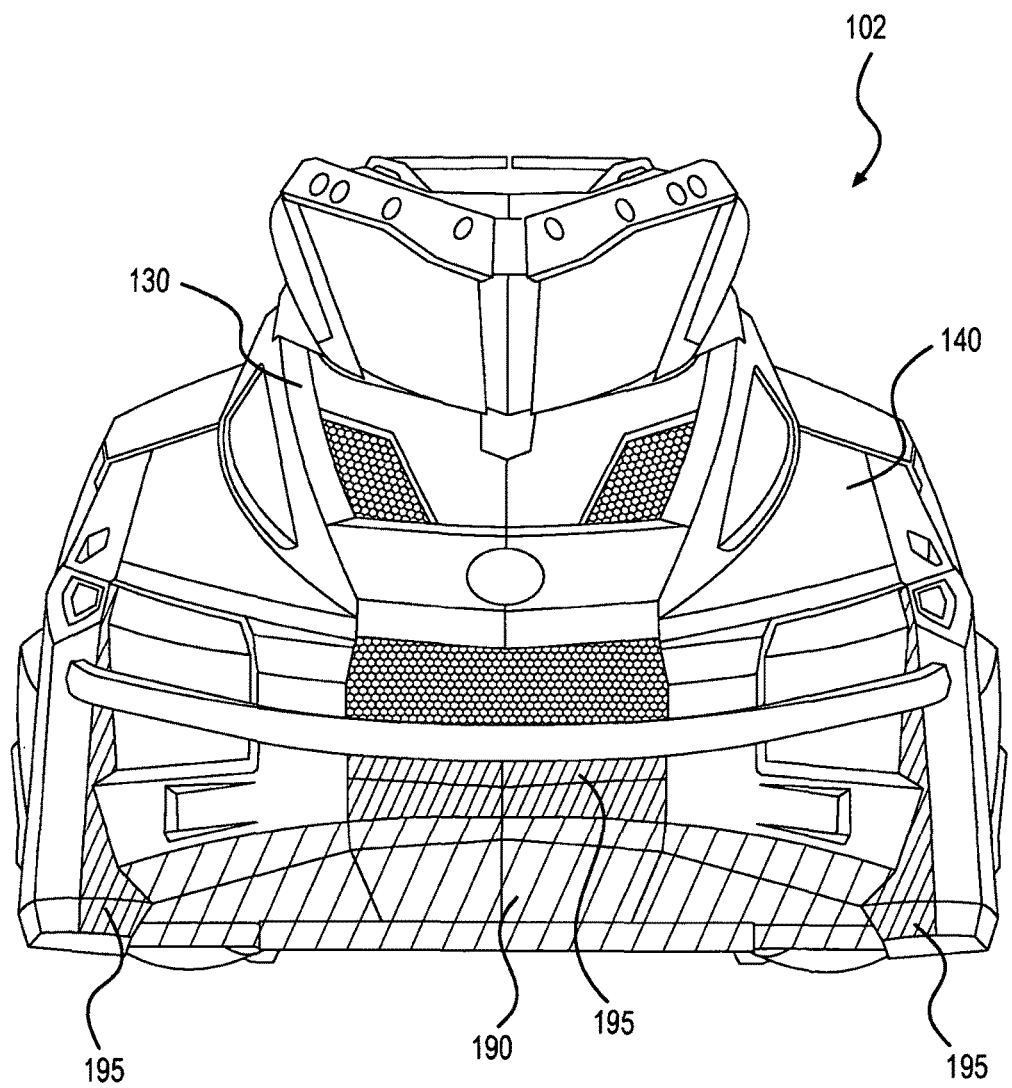
FIG. 7 is a front view of a front of the snowmobile of FIG. 1.

It is contemplated that only a portion of the bottom surface 160 of the hull 140 could have the average hull angle A between 10 and 30 degrees. As shown in FIG. 7, this portion corresponds to the hatched portion 190, while portions of the bottom surface 160 of the hull 140 outside this range correspond to hatched portions 195. In FIG. 7, the surface of the portion 190 corresponds to about 90% of the surface of the bottom surface 160. However, it is contemplated that the surface of the portion 190 could correspond to only 50% of the surface of the bottom surface 160 of the hull 140.

A second parameter is a track angle B. The front portion 125 of the drive track 126, which is substantially straight, defines a plane P disposed at the track angle B. In this embodiment, the track angle B is about 37 degrees. It is contemplated that a preferred range of track angles B could alternatively be between 20 and 40 degrees, and a preferably between 30 and 40 degrees.

A third parameter is a distance C, being a horizontal distance between the front drive axle assembly 127 and the left and right attachment points 150 of the skis 116 to the telescopic suspension struts 112. In this embodiment, the distance C is about 785 mm. It is contemplated that the distance C could alternatively be between 600 and 900 mm, and preferably between 700 and 800 mm.

The right combination of this average hull angle A, this track angle B, and this distance C together with the choice of telescopic suspension struts 112 provide good flotation characteristics for the snowmobile 100. Furthermore, as shown in FIG. 4, for at least these parameters (A=18 degrees, B=37 degrees, C=785 mm), the line L intersects the plane P at a point I below and forward of the bottom portion 124 of the drive track 126. Broken line 151 identifies the position of a forward extremity of the bottom portion 124 of the drive track 126.

With reference to FIG. 5, another embodiment of the snowmobile 100 (snowmobile 201) will be described. The snowmobile 201 comprises the same structural elements as the snowmobile 100, and for simplicity some of these same structural elements will not be repeated. The snowmobile 201 is designed according to maximal values A1, B1, and C1 of the design parameters A, B and C. The average hull angle A1 is 30 degrees, the track angle B1 is 40 degrees and the distance C1 is 900 mm.

With reference to FIG. 6, yet another embodiment of the snowmobile 100 (snowmobile 202) will be described. The snowmobile 202 comprises the same structural elements as the snowmobile 100, and for simplicity some of these same structural elements will not be repeated. The snowmobile 202 is designed according to minimal values A2, B2, and C2 of the design parameters A, B and C. The average hull angle A2 is 10 degrees, the track angle B2 is 37 degrees and the distance C2 is 600 mm.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A snowmobile having a front and a rear comprising:
   a frame comprising a tunnel and an engine cradle connected to a front of the tunnel;
   an engine mounted in the engine cradle;
   a drive track operatively connected to the tunnel, the drive track being operatively connected to the engine to propel the snowmobile, the drive track comprising a bottom portion and a front portion, the bottom portion being horizontal, the front portion having a lower end and an upper end, a rounded connecting section extending from a front of the bottom portion to the lower end of the front portion, the front portion defining a plane at a track angle;
   a front drive axle operatively connected to the engine and operatively engaging the drive track, the front drive axle having an axis of rotation;
   a straddle seat disposed on the tunnel rearwardly of the engine;
   left and right telescopic suspension struts operatively connected to the engine cradle, each of the left and right telescopic suspension struts having a strut axis;
   left and right skis connected to the left and right telescopic suspension struts at left and right attachment points respectively;
   a steering column operatively connected to the left and right skis to steer the skis;
   a handlebar connected to the steering column; and
   a hull connected to the frame forward to the engine cradle, the hull having a bottom surface, at least a portion of the bottom surface of the hull extending forwardly and upwardly toward the front of the snowmobile, a line tangential to the portion of the bottom surface of the hull at an average hull angle intersects the plane at an intersection point below and forward of the bottom portion of the drive track, and the line intersects a plane defined by the strut axes at a point below the axis of rotation of the front drive axle.

2. The snowmobile of claim 1, wherein the surface of the portion of the bottom surface of the hull is at least 50% of the surface of the bottom surface of the hull.

3. The snowmobile of claim 1, wherein the intersection point below and forward of the bottom portion of the drive track is rearward of the drive axle.

4. The snowmobile of claim 1, wherein the track angle is between 30 and 40 degrees from horizontal.

5. The snowmobile of claim 1, wherein a horizontal distance between the left and right attachment points and the front drive axle is between 700 mm and 800 mm.

6. The snowmobile of claim 1, wherein the average hull angle is between 15 and 25 degrees from horizontal.

* * * * *